(12) United States Patent
Okuma

(10) Patent No.: US 6,940,734 B2
(45) Date of Patent: Sep. 6, 2005

(54) POWER CONVERTER

(75) Inventor: Yasuhiro Okuma, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/487,768

(22) PCT Filed: May 28, 2003

(86) PCT No.: PCT/JP03/06692
§ 371 (c)(1),
(2), (4) Date: Jul. 2, 2004

(87) PCT Pub. No.: WO03/103126
PCT Pub. Date: Dec. 11, 2003

(65) Prior Publication Data
US 2004/0233688 A1 Nov. 25, 2004

(30) Foreign Application Priority Data
Jun. 3, 2002 (JP) .................................... 2002-161313
Jan. 28, 2003 (JP) ....................................... 2003-18713

(51) Int. Cl.[7] ........................................... H02M 5/458
(52) U.S. Cl. ....................................................... 363/37
(58) Field of Search ................................... 363/34, 37

(56) References Cited

U.S. PATENT DOCUMENTS

| 4,933,831 | A | * | 6/1990 | Takahashi et al. | 363/132 |
|---|---|---|---|---|---|
| 5,017,800 | A | * | 5/1991 | Divan | 307/66 |
| 5,045,989 | A | * | 9/1991 | Higaki et al. | 363/37 |
| 5,111,373 | A | * | 5/1992 | Higaki | 363/37 |
| 5,416,686 | A | * | 5/1995 | Azuma et al. | 363/37 |
| 5,450,311 | A | * | 9/1995 | Esparza Olcina | 363/79 |
| 5,654,591 | A | * | 8/1997 | Mabboux et al. | 307/66 |
| 6,084,785 | A | * | 7/2000 | Kunisada et al. | 363/37 |
| 6,310,787 | B2 | * | 10/2001 | Ito et al. | 363/34 |
| 6,665,198 | B2 | * | 12/2003 | Tasi et al. | 363/39 |
| 6,671,191 | B2 | * | 12/2003 | Hanaoka et al. | 363/37 |

FOREIGN PATENT DOCUMENTS

| JP | 2000-262070 | 9/2000 |
|---|---|---|
| JP | 3203464 | 6/2001 |

* cited by examiner

Primary Examiner—Jeffrey Sterrett
(74) Attorney, Agent, or Firm—Manabu Kanesaka

(57) ABSTRACT

The electric power converter includes a series converter connected in series between an AC power supply 1 and a load 6, and having capacitors 30, 31 as a power supply for the converter, switching devices 12, 13, and diodes 16, 17; and a parallel converter connected in parallel to the AC power supply 1 and having the capacitors 30, 31, switching devices 10, 11, and diodes 14, 15. The series converter compensate the change in the voltage of the AC power supply 1 to feed a certain voltage to the load 6, and the parallel converter conducts charging and discharging operations to compensate the changes in the voltages of the capacitors 30 and 31 caused by the compensating operations of the series converter. The converter suppresses the change of the AC power supply voltage and feeds a certain voltage to the load at a high efficiency and low running costs.

12 Claims, 12 Drawing Sheets

POWER CONVERTER

BACKGROUND OF THE INVENTION AND RELATED ART STATEMENT

The present invention relates to an electric power converter having a specific feature in a main circuit configuration thereof for supplying a constant voltage from an AC power supply to a load.

FIG. 10 is a block circuit diagram of a conventional electric power converter for converting AC electric power to DC electric power and for converting the converted DC electric power back to AC electric power.

Referring to FIG. 10, a series circuit consisting of semiconductor switching devices 10 and 11 is connected to an end of an AC power supply 1 via a reactor 40. Diodes 14 and 15 are connected to the semiconductor switching devices 10 and 11 in opposite parallel, respectively.

The semiconductor switching devices 10 and 11, controlled by PWM (pulse width modulation), work together with the diodes 14 and 15 as a rectifier circuit for conducting control and conversion operations to make voltages at capacitors 30 and 31 DC voltages while storing energy in the capacitors 30 and 31 connected in series.

A series circuit consisting of switching devices 12 and 13 is connected to the series circuit consisting of the capacitors 30 and 31. Diodes 16 and 17 are connected to the switching devices 12 and 13 in opposite parallel, respectively. The switching devices 12 and 13 are operated as an inverter through the PWM control to generate an arbitrary stable AC voltage from the smoothed DC voltage, and the generated AC voltage is supplied to a load 6.

A capacitor 32 connected to both ends of the AC power supply 1 works as a filter capacitor. A reactor 41 and a capacitor 33 connected to an input side of the load 6 constitute an LC filter.

An electric power converter substantially identical to the conventional electric power converter shown in FIG. 10 has been described in the following Patent Reference 1.

[Patent Reference 1]

Japanese Patent No. 3203464 (FIG. 1, Paragraphs [0003] and [0004])

The conventional electric power converter shown in FIG. 10 has a so-called double converter circuit configuration in which AC electric power is converted to DC electric power once and the DC electric power is converted back to AC electric power.

FIG. 11 is a diagram for explaining the principle of the circuit shown in FIG. 10. In the circuit shown in FIG. 10, the converter at a side of the AC power supply 1, having the switches devices 10 and 11 and the diodes 14 and 15, works as a rectifier circuit. Therefore, the rectifier circuit can be regarded as a parallel current source 5 through which all the energy necessary for the load 6 flows, as shown in FIG. 11.

Also in FIG. 10, the converter at a side of the load 6, including the switch devices 12 and 13 and the diodes 16 and 17, works as an inverter to supply a certain voltage to the load 6. Therefore, the inverter can be regarded as a parallel voltage source 3 through which all the energy necessary for the load 6 flows, as shown in FIG. 11.

As described above, in the conventional electric power converter shown in FIG. 10 and the double converter type power converter disclosed in Patent Reference 1, all the energy supplied to the load flows through both the converter at the side of the AC power supply 1 and the converter at the side of the load 6. Therefore, loss generated in such a converter becomes high. As a result, the conversion efficiency decreases and running cost increases.

Accordingly, in the present invention, the AC power supply 1 of the double converter is connected to the load 6 in a different way to provide a so-called serial parallel converter configuration, in which the converter at the side of the load 6 works as a series converter. When the voltage of the AC power supply 1 is changed, the series converter compensates only the change in the voltage, and the parallel converter at the side of the AC power supply 1 compensates only the energy necessary for the compensation.

In other words, an object of the present invention is to provide an electric power converter with high conversion efficiency, thereby reducing running cost.

Another object of the present invention is to provide an electric power converter capable of supplying a constant voltage to the load while suppressing the voltage change of the AC power supply 1.

SUMMARY OF THE INVENTION

In order to achieve the objects described above, according to a first aspect of the present invention, an electric power converter includes a series converter connected in series between an AC power supply and a load and including a capacitor as a converter power supply, and a parallel converter connected to the AC power supply in parallel. As structural features, the series converter compensates a change in a voltage of the AC power supply to maintain a voltage supplied to the load at a constant level. At the same time, the parallel converter conducts charging and discharging operations between the AC power supply and the capacitor to compensate a change in a voltage of the capacitor caused by the compensating operation of the series converter.

More specific aspects of the first aspect of the present invention will be described below in detail.

According to a second aspect of the invention, the electric power converter of the first aspect of the invention includes:

a first series switch circuit including a first semiconductor switching device and a second semiconductor switching device connected to each other in series and connected to diodes in opposite parallel, respectively;

a second series switch circuit including a third semiconductor switching device and a fourth semiconductor switching device connected to each other in series and connected to diodes in opposite parallel, respectively;

a series capacitor circuit including a first capacitor and a second capacitor connected to each other in series;

a third capacitor connected to the AC power supply in parallel;

a fourth capacitor connected to the load in parallel;

a first reactor connected between one end of the AC power supply connected to one end of the load and a series connection point in the first series switch circuit; and a second reactor connected between the other end of the load and a series connection point in the second series switch circuit;

wherein the first series switch circuit, the second series switch circuit, and the series capacitor circuit are connected to each other in parallel to constitute a first parallel connection circuit;

the other end of the AC power supply is connected to the series connection point in the series capacitor circuit;

the series capacitor circuit and the second series switch circuit constitute the series converter; and the series capacitor circuit and the first series switch circuit constitute the parallel converter.

According to a third aspect of the invention, the electric power converter of the second aspect of the invention includes:

voltage detecting means for detecting input and output voltages of the electric power converter and a voltage in the first parallel connection circuit;

current detecting means for detecting a current flowing through the first reactor; and controlling means for controlling the output voltage of the electric power converter and the current flowing through the first reactor using detected values of these detecting means.

According to a fourth aspect of the invention, the electric power converter of the second or third aspect of the invention includes:

a changeover switch including a first changeover contact, a second changeover contact, and a common terminal;

wherein the other end of the load is disconnected from one end of the second reactor;

the first changeover contact is connected to the series connection point in the series capacitor circuit;

the other end of the load is connected to the one end of the second reactor via the common terminal and the second changeover contact when the electric power converter is working normally; and the common terminal is connected to the first changeover contact to supply a voltage from the AC power supply to the load when the electric power converter is working abnormally.

According to a fifth aspect of the invention, the electric power converter of the second or third aspect of the invention includes:

an energy storage element, and charging and discharging means connected to the energy storage element, wherein a voltage is supplied to the load using energy stored in the energy storage element when the power supply voltage is working abnormally.

According to a sixth aspect of the invention, the electric power converter of the fourth aspect of the invention includes:

an energy storage element, and charging and discharging means connected to the energy storage element, wherein a voltage is supplied to the load using energy stored in the energy storage element when the power supply voltage is working abnormally.

According to a seventh aspect of the invention, the electric power converter of the second or third aspect of the invention includes:

a third reactor with a tap in substitution for the second reactor;

wherein the series connection point in the series capacitor circuit is connected to one end of the third reactor, the series connection point in the second series switch circuit is connected to the other end of the load through the other end of the third reactor, and the other end of the AC power supply is disconnected from the series connection point in the series capacitor circuit and is connected to the tap terminal of the third reactor.

According to an eighth aspect of the invention, the electric power converter of the fourth aspect of the invention includes:

a third reactor with a tap in substitution for the second reactor;

wherein the series connection point in the series capacitor circuit is connected to one end of the third reactor, the series connection point in the second series switch circuit is connected to the other end of the load through the other end of the third reactor, and the other end of the AC power supply is disconnected from the series connection point in the series capacitor circuit and is connected to the tap terminal of the third reactor.

According to a ninth aspect of the invention, the electric power converter of the fifth aspect of the invention includes:

a third reactor with a tap in substitution for the second reactor;

wherein the series connection point in the series capacitor circuit is connected to one end of the third reactor, the series connection point in the second series switch circuit is connected to the other end of the load through the other end of the third reactor, and the other end of the AC power supply is disconnected from the series connection point in the series capacitor circuit and is connected to the tap terminal of the third reactor.

According to a tenth aspect of the invention, the connection position of the fourth capacitor in the second aspect is changed.

That is, according to the tenth aspect of the invention, the electric power converter of the first aspect includes:

a first series switch circuit including a first semiconductor switching device and a second semiconductor switching device connected to each other in series and connected to diodes in opposite parallel, respectively;

a second series switch circuit including a third semiconductor switching device and a fourth semiconductor switching device connected to each other in series and connected to diodes in opposite parallel, respectively;

a series capacitor circuit including a first capacitor and a second capacitor connected to each other in series;

a third capacitor connected to the AC power supply in parallel;

a first reactor connected between one end of the AC power supply connected to one end of the load and a series connection point in the first series switch circuit;

a second reactor connected between the other end of the load and a series connection point in the second series switch circuit; and a fourth capacitor connected between the second end of the load and the second end of the AC power supply;

wherein the first series switch circuit, the second series switch circuit, and the series capacitor circuit are connected to each other in parallel to constitute a first parallel connection circuit;

the other end of the AC power supply is connected to the series connection point in the series capacitor circuit;

the series capacitor circuit and the second series switch circuit constitute the series converter; and the series capacitor circuit and the first series switch circuit constitute the parallel converter.

According to an eleventh aspect of the invention, the electric power converter of the tenth aspect of the invention includes:

voltage detecting means for detecting input and output voltages of the electric power converter and a voltage in the first parallel connection circuit;

current detecting means for detecting a current flowing through the first reactor; and controlling means for controlling the output voltage of the electric power converter and the current flowing through the first reactor using detected values of the voltage detecting means and the current detecting means.

According to a twelfth aspect of the invention, the electric power converter of the tenth or eleventh aspect of the invention includes:

an energy storage element, and charging and discharging means connected to the energy storage element, wherein a voltage is supplied to the load using energy stored in the energy storage element when the power supply voltage is working abnormally.

According to a thirteenth aspect of the invention, the electric power converter of the tenth or eleventh aspect of the invention includes:

a third reactor with a tap in substitution for the second reactor;

wherein the series connection point in the series capacitor circuit is connected to one end of the third reactor, the series connection point in the second series switch circuit is connected to the other end of the load through the other end of the third reactor, and the other end of the AC power supply is disconnected from the series connection point in the series capacitor circuit and is connected to the tap terminal of the third reactor.

According to a fourteenth aspect of the invention, the electric power converter of the twelfth aspect of the invention includes:

a third reactor with a tap in substitution for the second reactor;

wherein the series connection point in the series capacitor circuit is connected to one end of the third reactor, the series connection point in the second series switch circuit is connected to the other end of the load through the other end of the third reactor, and the other end of the AC power supply is disconnected from the series connection point in the series capacitor circuit and is connected to the tap terminal of the third reactor.

DETAILED DESCRIPTION OF PREFERRED EMBODIMENTS

Hereunder, embodiments of the present invention will be explained in detail with reference to the accompanying drawings.

Figure 1:
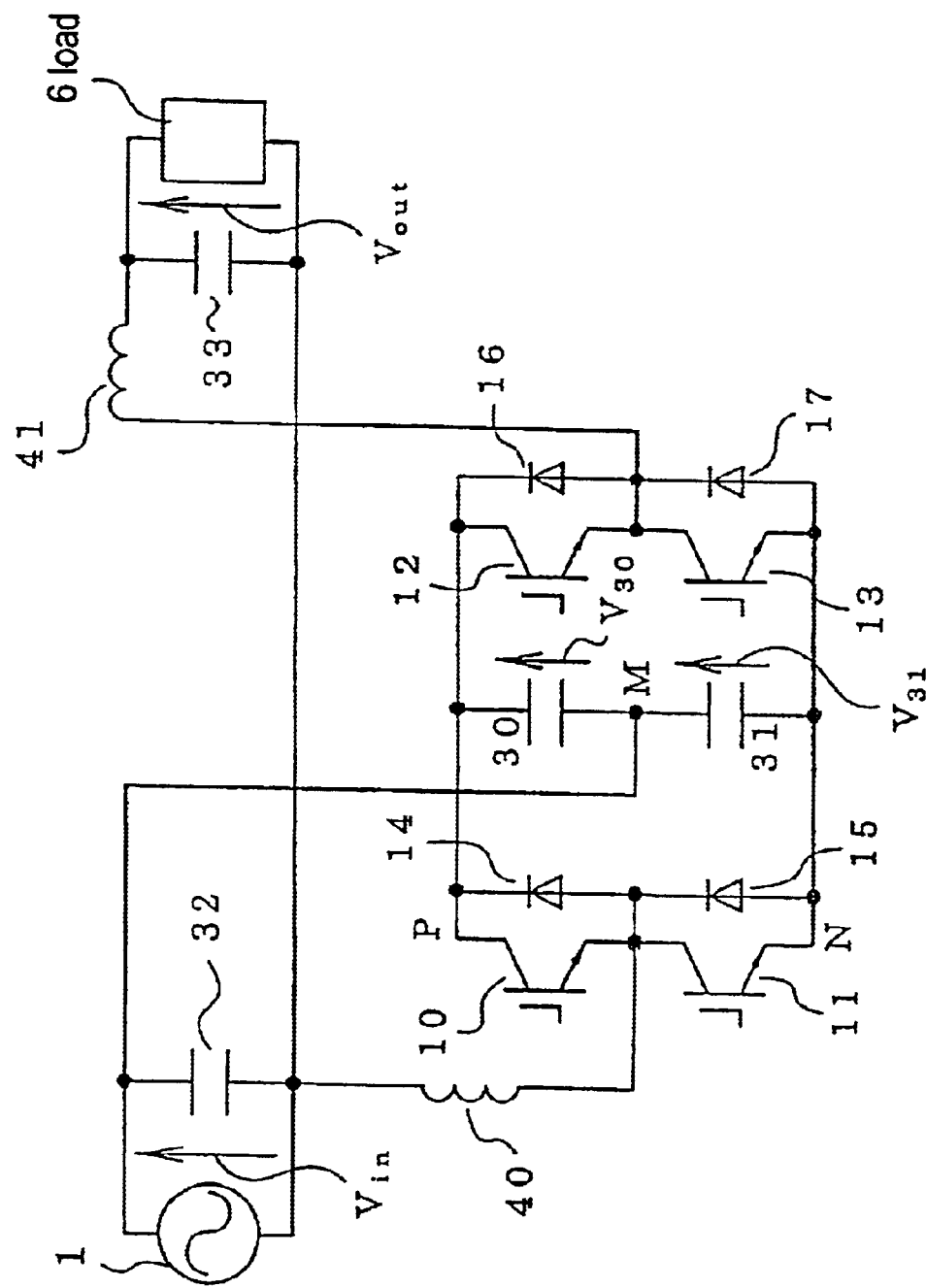
FIG. 1 is a block circuit diagram showing a first embodiment of the invention.

FIG. 1 is a block circuit diagram showing a first embodiment of the invention corresponding to first and second aspects of the invention.

Referring to FIG. 1, a series circuit of first and second semiconductor switching devices 10 and 11 such as an IGBT (insulated gate bipolar transistor) connected to first and second diodes 14 and 15 in opposite parallel (referred to as a first series switch circuit), a series circuit of third and fourth semiconductor switching devices 12 and 13 connected to third and fourth diodes 16 and 17 in opposite parallel (referred to as a second series switch circuit), and a series circuit of first and second capacitors 30 and 31 (referred to as a series capacitor circuit) are connected to each other in parallel. A third capacitor 32 is connected to an AC power supply 1 in parallel, and a fourth capacitor 33 is connected to a load 6 in parallel.

One end of the AC power supply 1 is connected to one end of the load 6, and the other end of the AC power supply 1 is connected to a series connection point of the capacitors 30 and 31. A connection point of the AC power supply 1 and the load 6 is connected to a series connection point of the first and second switching devices 10 and 11 via a first reactor 40. The other end of the load 6 is connected to a series connection point of the third and fourth switching devices 12 and 13 via a second reactor 41.

In the circuit configuration described above, when the capacitors 30 and 31 are regarded as a power supply of a converter including switching devices, the capacitors 30 and 31, the switching devices 12 and 13, and the diodes 16 and 17 are connected in series between the AC power supply 1 and the load 6. Hereinafter, the series circuit is referred to as a series converter.

Also, the capacitors 30 and 31, the switching devices 10 and 11, and the diodes 14 and 15 are connected to the AC power supply 1 in parallel. Hereinafter, the parallel circuit is referred to as a parallel converter.

Figure 2:
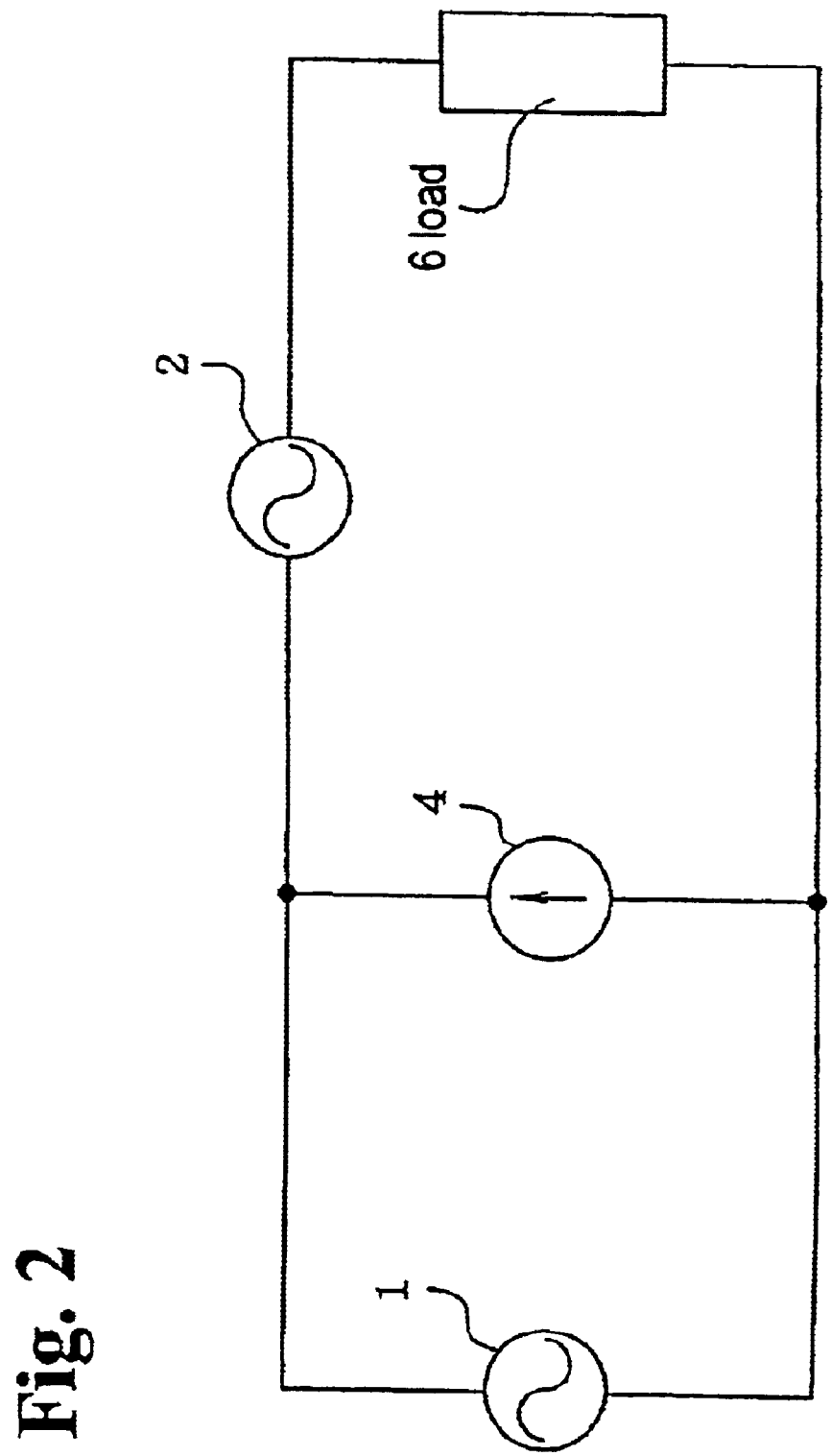
FIG. 2 is a diagram for explaining the principle of the embodiment shown in FIG. 1.

FIG. 2 is a diagram for explaining the principle of the embodiment shown in FIG. 1.

Referring to FIG. 2, a parallel compensation current source 4 represents the parallel converter described above, and a series compensation voltage source 2 represents the series converter described above. In this case, the series compensation voltage source 2 generates an arbitrary voltage, so that voltages from two power supplies, i.e. the AC power supply 1 (AC voltage source) and the series compensation voltage source 2, are added and applied to the load 6. As a result, even if the voltage of the AC power supply 1 varies and drops, the variable voltage from the series compensation voltage source 2 is added and applied to the load 6, so that the voltage drop is compensated and a constant voltage can be supplied to the load 6.

Figure 3:
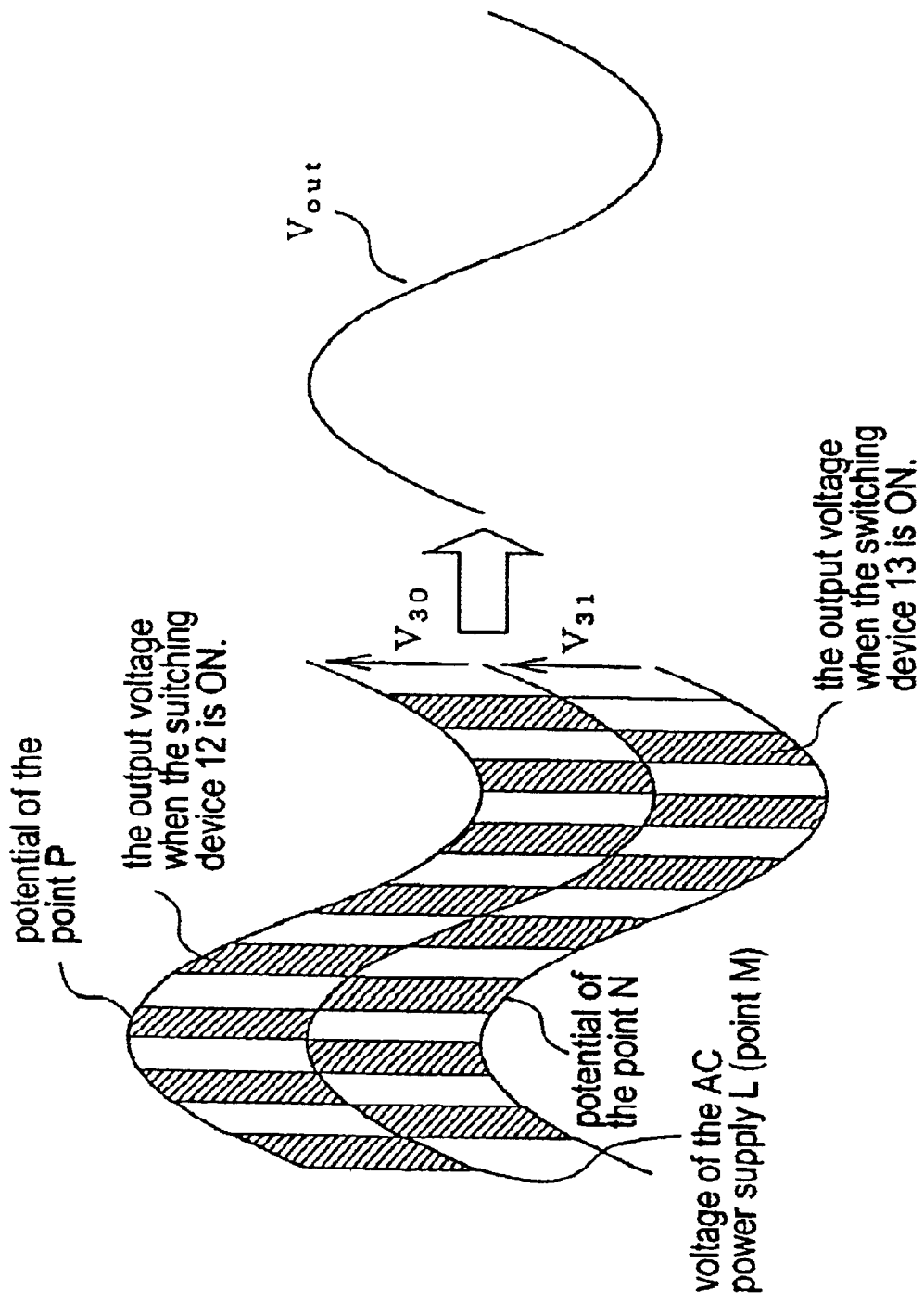
FIG. 3 is a wave chart for explaining an operation of a series converter shown in FIG. 1.

Referring to FIG. 3, an operation of the series converter shown in FIG. 1 will be explained further.

With respect to potentials at points P, M and N shown in FIG. 1, as shown in FIG. 3, a voltage $V_{30}$ of the capacitor 30 is superposed with a potential at the point M (voltage $V_{in}$ of the AC power supply 1) to become a potential at the point P, and a voltage $V_{31}$ of the capacitor 31 is superposed with the potential at the point M to become a potential at the point N. By controlling the superposed voltages (voltages of hatching portions in FIG. 3) through chopping of the switching devices 12 and 13, it is possible to superpose an arbitrary voltage with the potential at the point M to maintain a voltage $V_{out}$ at both ends of the load 6 at a constant level.

The chopping through on-off control of the switching devices 12 and 13 is conducted by PWM control so that the voltage $V_{out}$ at both ends of the load 6 is maintained at a specified value, or by the PWM control with the voltage added to or subtracted from the potential at the point M as the specified value.

Incidentally, in the power supply controlled by PWM, it is obvious that a waveform of the voltage supplied to the load 6 is made a sinusoidal waveform in general, and the waveform of the voltage can be made an arbitrary waveform if necessary.

In the series of the operations described above, the parallel converter (parallel compensation current source 4) conducts charging and discharging operations between the AC power supply 1 and the capacitors 30 and 31 to compensate voltage changes (drop and rise) of the capacitors 30 and 31 caused by the operations of the series converter (series compensation power supply 2).

As a result, energy supplied to the load 6 flows only through the series converter, and energy used only for the voltage compensation by the series converter flows through the parallel converter. Therefore, as compared with a conventional double converter configuration, it is possible to reduce loss caused by the parallel converter and improve conversion efficiency of the entire electric power converter.

Figure 4:
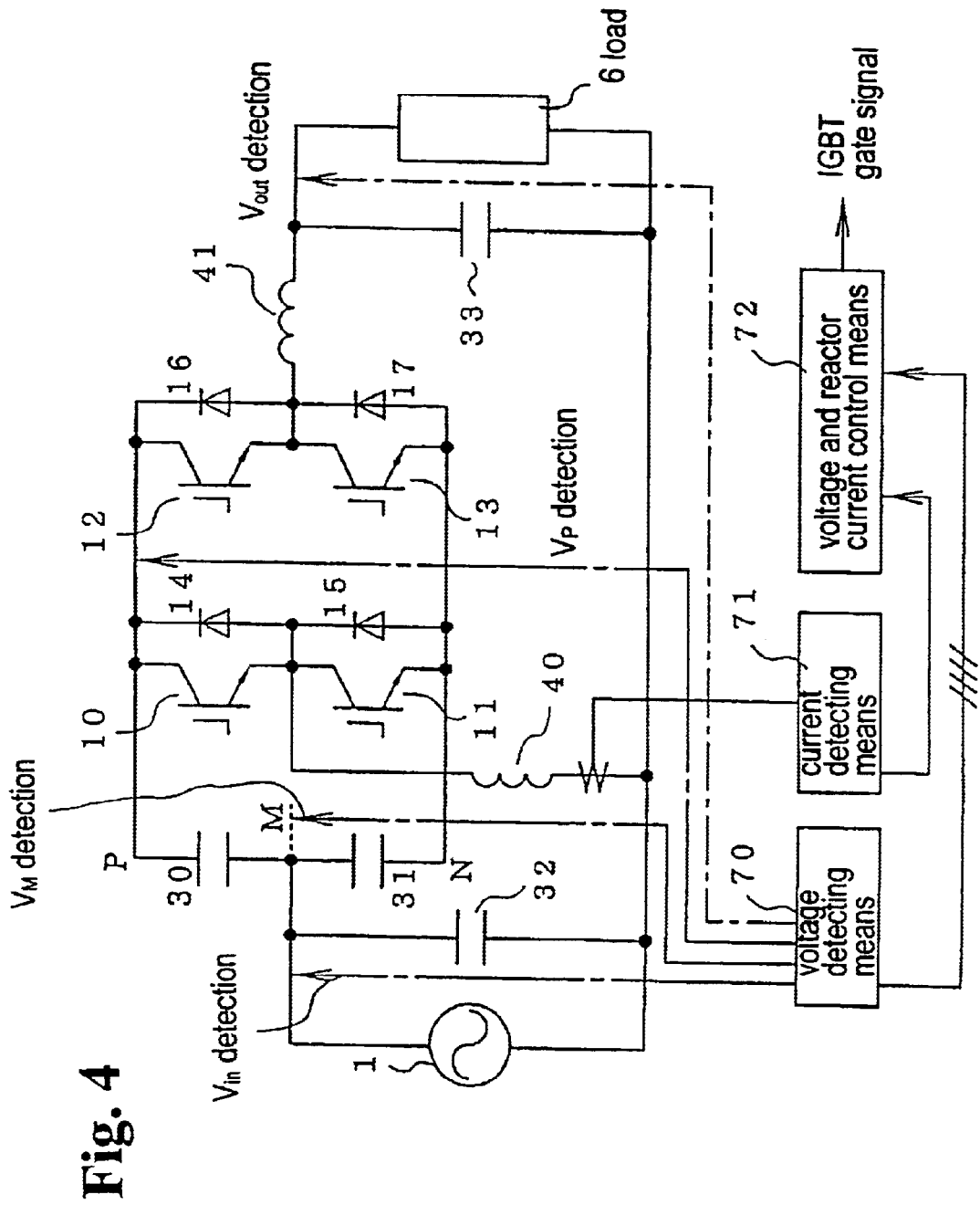
FIG. 4 is a block circuit diagram showing a second embodiment of the invention.

FIG. 4 is a block circuit diagram showing a second embodiment of the invention corresponding to a third aspect of the invention.

A main circuit configuration shown in FIG. 4 is substantially identical to that shown in FIG. 1. Features different from FIG. 1 are that the voltage detecting means 70 is provided for detecting the voltage $V_{in}$ at both ends of the AC power supply 1, a voltage $V_M$ ($V_{MN}$) at the pint M based on the potential at the point N, a voltage $V_P$ ($V_{PN}$) at the pint P based on the potential of the point N, and the voltage $V_{out}$; current detecting means 71 is provided for detecting a current flowing through the reactor 40; and voltage and reactor current control means 72 is provided for controlling the output voltage and the current flowing through the reactor 40.

In the circuit configuration described above, with the voltage $V_{in}$ across the AC power supply 1 detected by the voltage detecting means 70 as a reference sinusoidal wave, it is operated such that the current flowing through the reactor 40 and detected by the current detecting means 71 follows the sinusoidal wave by the voltage and reactor current control means 72. With this operation, when the circuit shown in FIG. 1 supplies the voltage $V_{out}$ with a sinusoidal waveform to the load 6, a sinusoidal current is made to flow by following the sinusoidal voltage.

Figure 5:
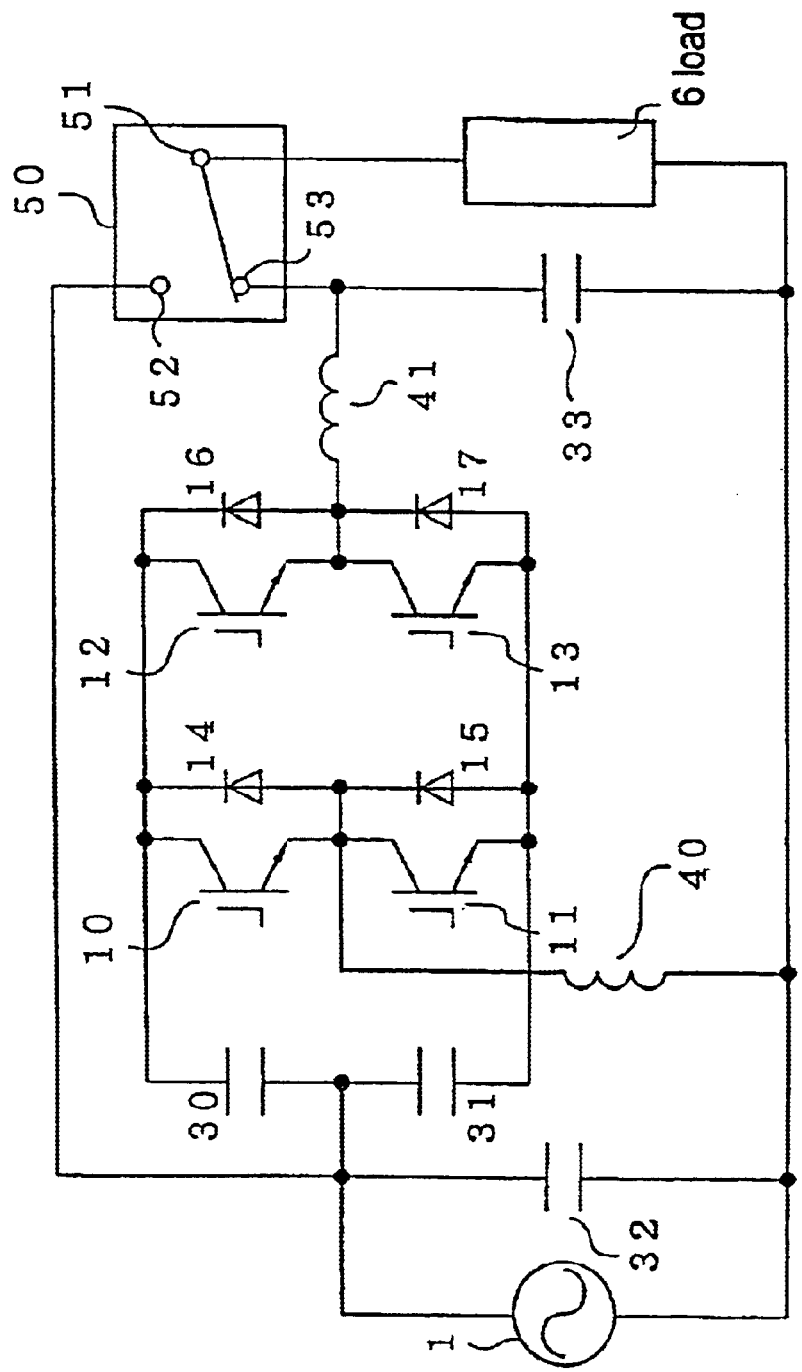
FIG. 5 is a block circuit diagram showing a third embodiment of the invention.

FIG. 5 is a block circuit diagram showing a third embodiment of the invention corresponding to a fourth aspect of the invention.

Features different from FIG. 1 are that a changeover switch 50 having first and second changeover contacts 52 and 53 is provided; a common terminal 51 is connected to one end of the load 6; the series connection point of the capacitors 30 and 31 is connected to the first changeover contact 52; and the connection point of the reactor 41 and the capacitor 33 is connected to the second changeover contact 53.

In the circuit configuration described above, in a state that the common terminal 51 of the changeover switch 50 is connected to a side of the second changeover contact 53 (substantially identical to the state shown in FIG. 1), when an anomaly occurs due to a fault in the electric power converter while operating the electric power converter shown in FIGS. 1 and 4, the connection of the common terminal 51 is changed from the second changeover contact 53 (side of the electric power converter) to the first changeover contact 52 (side of the AC power supply 1), so that the voltage supply to the load 6 is maintained. It is obvious that conditions necessary for the changeover of the changeover switch 50 are given by a combination of a signal from the control circuit of the converter and a contact signal.

Figure 6:
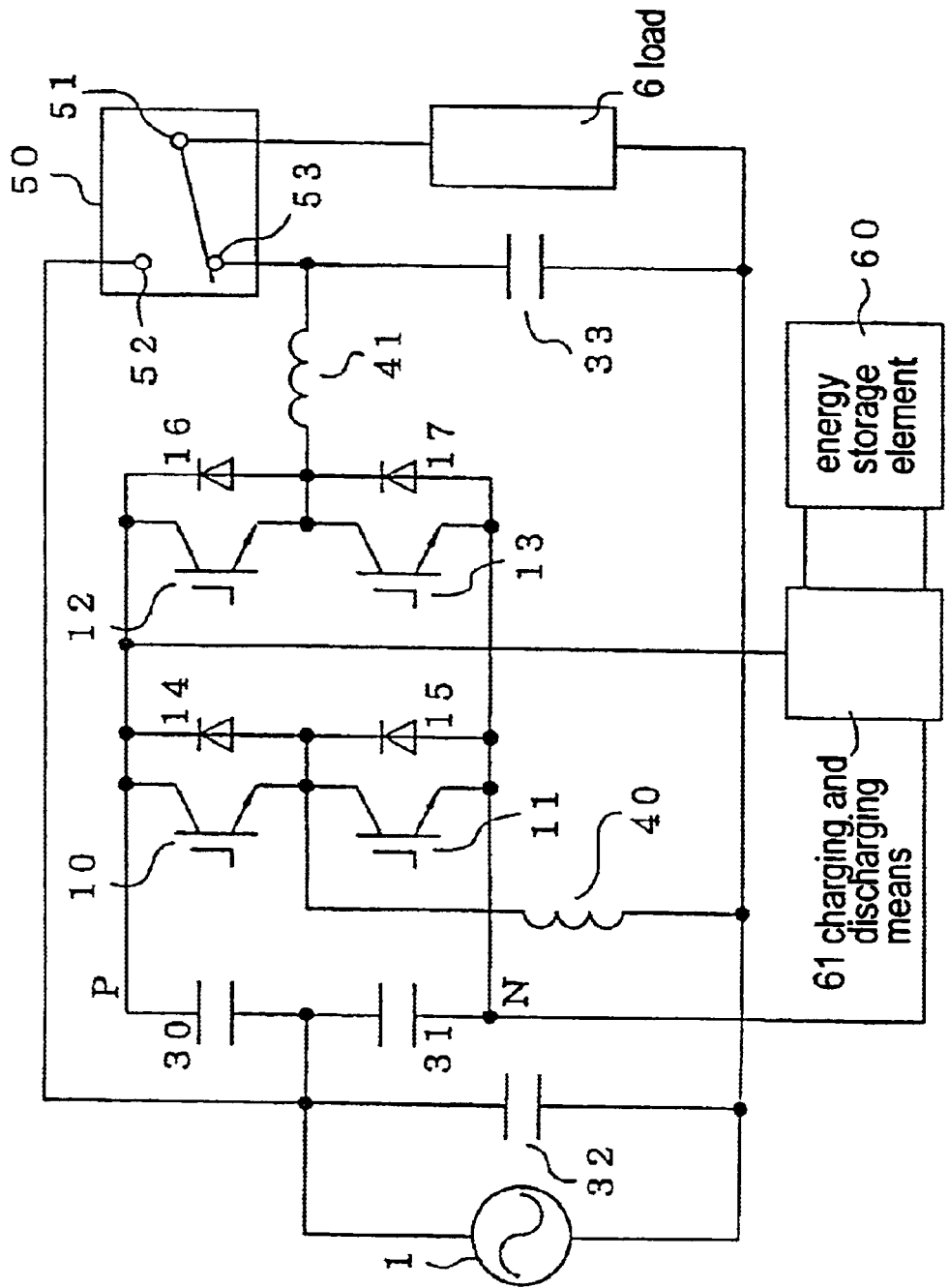
FIG. 6 is a block circuit diagram showing a fourth embodiment of the invention.

FIG. 6 is a block circuit diagram showing a fourth embodiment of the invention corresponding to a sixth aspect of the invention.

In the embodiment, an energy storage element 60 is connected between the points P and N in parallel through charging and discharging means 61.

While FIG. 6 shows a configuration in which the energy storage element 60 and the charging and discharging means 61 are added to the configuration shown in FIG. 5, they may be added to the configurations shown in FIGS. 1 and 4.

A circuit in which the energy storage element 60 and the charging and discharging means 61 are added to the configurations shown in FIGS. 1 and 4 corresponds to a fifth aspect of the invention.

The charging and discharging means 61 is formed of a semiconductor switch and a magnetic component such as a reactor, and the energy storage element 60 may include a secondary cell such as a battery or a flywheel.

In the circuit configuration described above, when the AC power supply 1 is working normally, energy is stored in the energy storage element 60 via the charging and discharging means 61. When sufficient electric power is not supplied to the load 6 due to an anomaly of the AC power supply 1, the energy storage element 60 is connected between the points P and N via the charging and discharging means 61.

With this configuration, when the AC power supply 1 is working normally, the energy is stored in the energy storage element 60 via the charging and discharging means 61, and in case of the anomaly of the AC power supply 1 such as power outage, the energy is discharged from the energy storage element 60 via the charging and discharging means 61 and supplied to the capacitors 30 and 31. Accordingly, in case of the anomaly of the AC power supply 1, it is possible to continue to supply a specified voltage to the load 6 stably by using the parallel converter and the series converter continuously.

Figure 7:
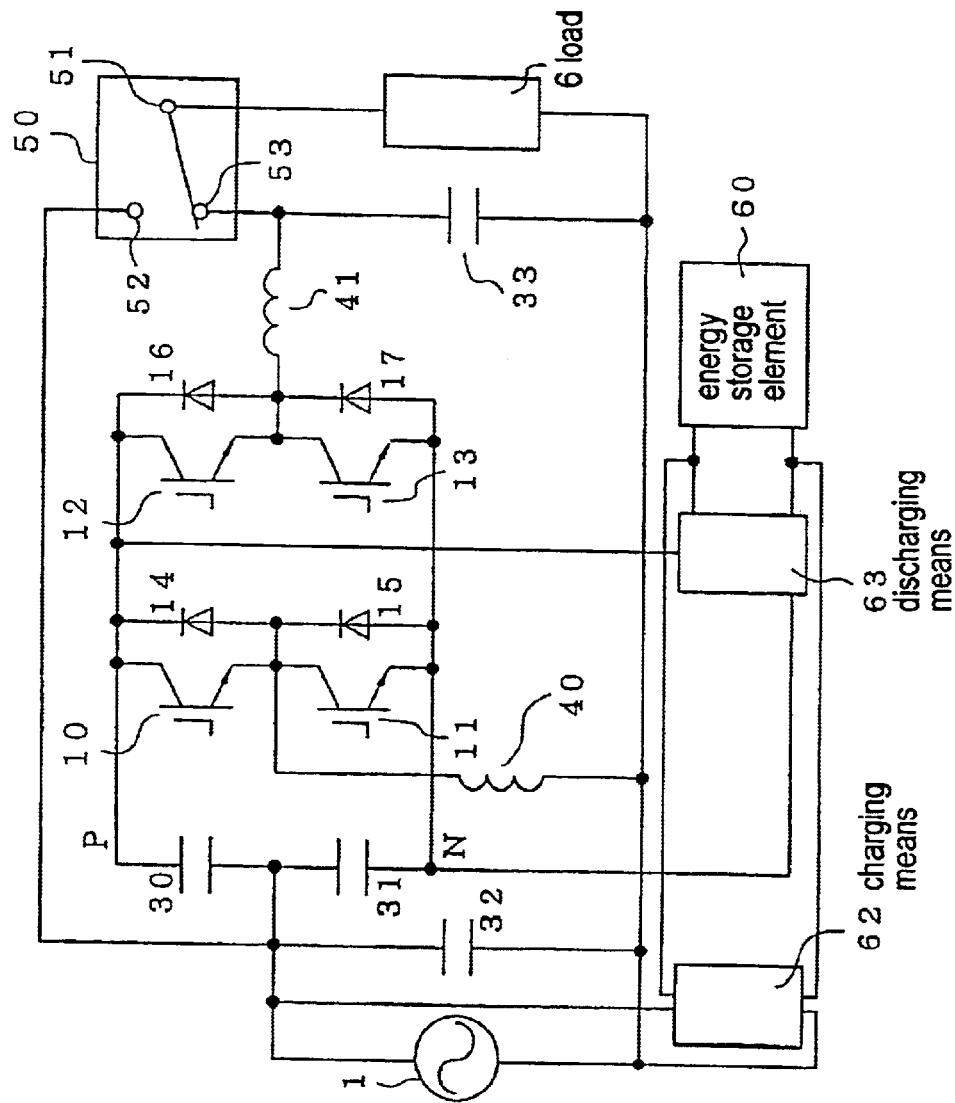
FIG. 7 is a block circuit diagram showing a fifth embodiment of the invention.

FIG. 7 is a block circuit diagram showing a fifth embodiment of the invention corresponding to a sixth aspect of the invention.

In the fifth embodiment, the charging and discharging means 61 shown in FIG. 6 is divided and charging means 62 is connected to both ends of the AC power supply 1; discharging means 63 is connected between the points P and N; and the energy storage element 60 is connected to the charging means 62 and the discharging means 63 in parallel. Incidentally, the charging means 62, the discharging means 63, and the energy storage element 60 may be added to the circuit configurations shown in FIGS. 1 and 4, so that in this case the fifth aspect of the invention is configured.

In the circuit configuration described above, when the AC power supply 1 is working normally, the charging means 62 charges up the energy storage element 60. In case of the anomaly of the AC power supply 1 such as power outage, the energy stored in the energy storage element 60 is supplied to the capacitors 30 and 31 using the discharging means 63. While the parallel converter and the series converter are operated using the energy, the voltage is supplied to the load 6.

The charging means 62 and the discharging means 63 are formed of a combination of a semiconductor switch and a magnetic component, and the one shown in FIG. 6 may be used as the energy storage element 60.

Figure 8:
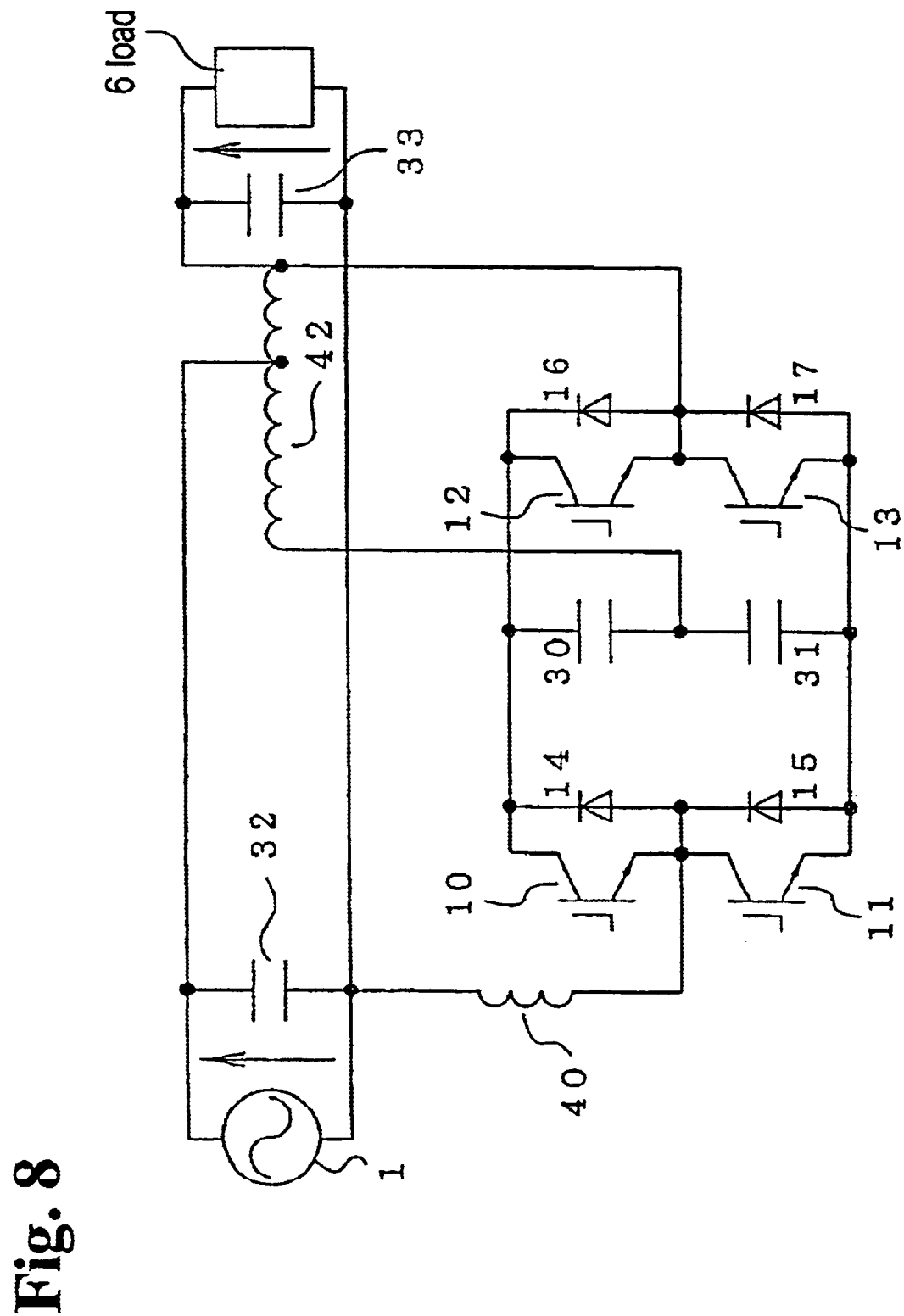
FIG. 8 is a block circuit diagram showing a sixth embodiment of the invention.

FIG. 8 is a block circuit diagram showing a sixth embodiment of the invention corresponding to a seventh aspect of the invention.

In the circuit configurations described above, for example, the one shown in FIG. 1, the reactor 41 is changed to a tapped reactor 42. One end of the tapped reactor 42 is connected to the series connection point of the capacitors 30 and 31, and the other end of the tapped reactor 42 is connected to one end of the load 6 not connected to the AC power supply 1 and the series connection point of the switching devices 12 and 13. The one end of the AC power supply 1 not connected to the load 6 is connected to the tap terminal of the tapped reactor 42.

With the circuit configuration described above, it is possible to reduce the current flowing through the series converter formed of the capacitors 30 and 31, the switching devices 12 and 13, and the diodes 16, 17, thereby reducing switching lose and further improving the conversion efficiency.

The operation of the parallel converter is the same, thereby omitting the description.

The circuit configuration using the tapped reactor 42 as shown in FIG. 8 is applicable to the embodiments shown in FIGS. 4 through 7 as described in eight and ninth aspects of the invention.

Figure 9:
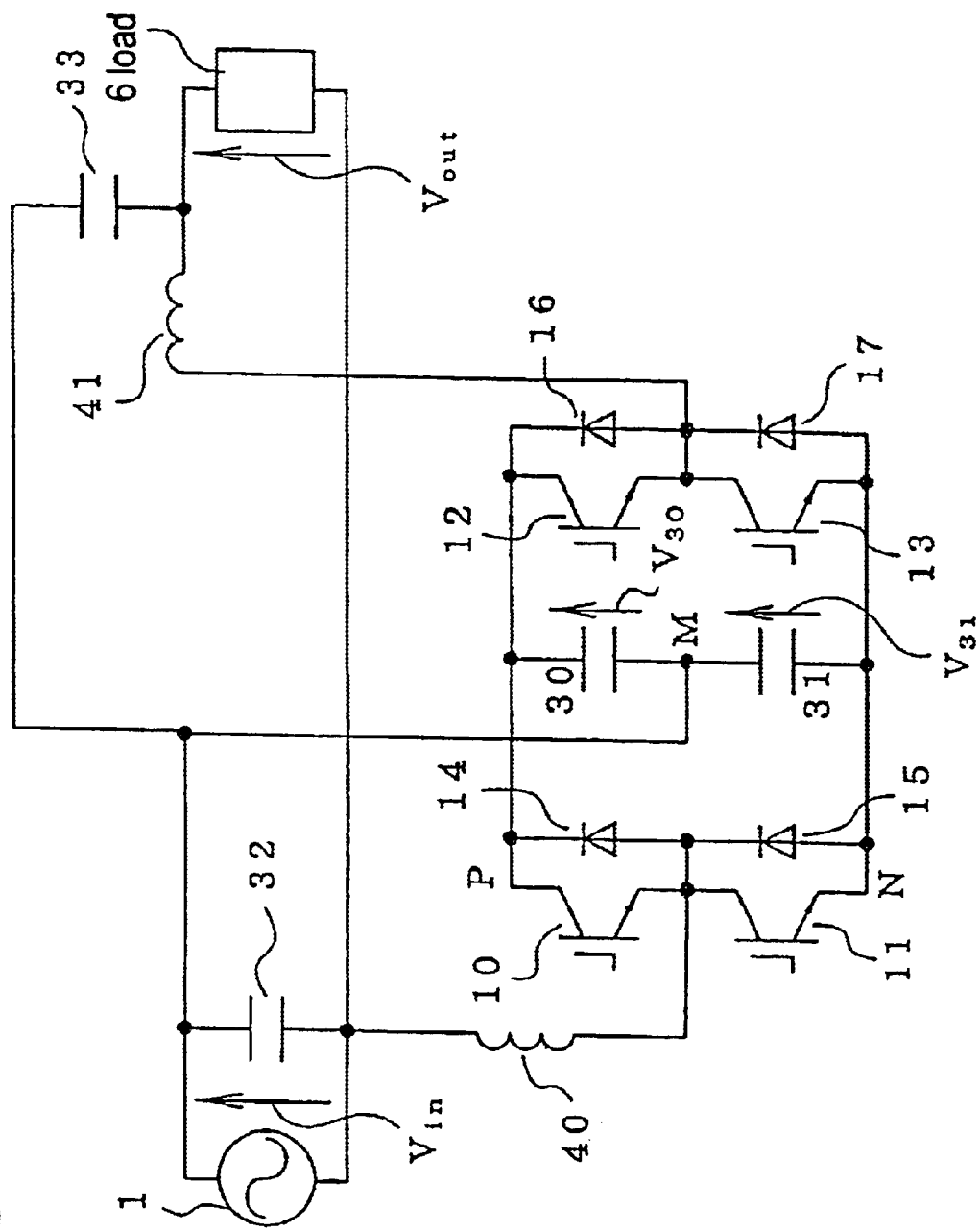
FIG. 9 is a block circuit diagram showing a seventh embodiment of the invention.
Figure 10:
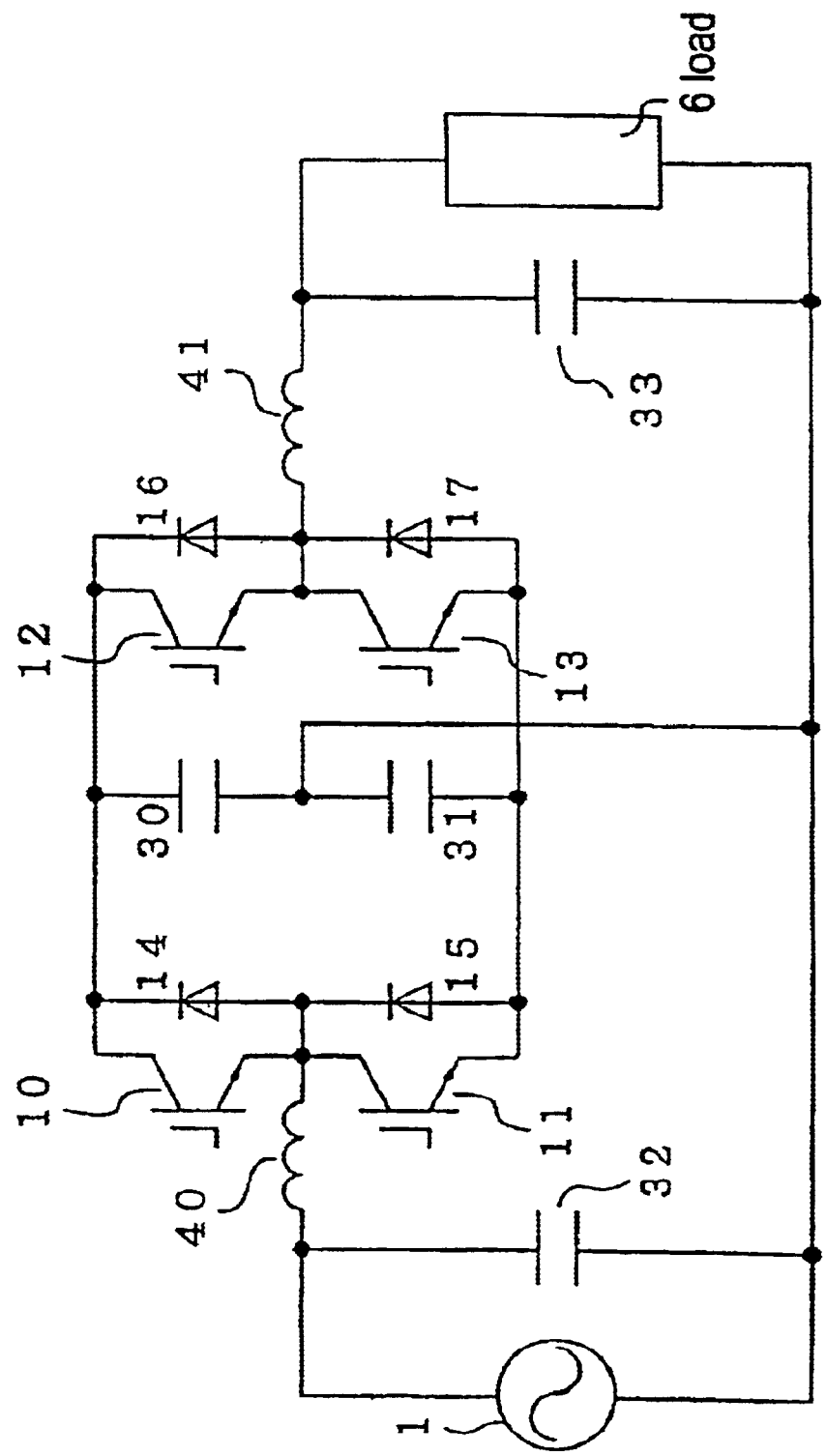
FIG. 10 is a block circuit diagram showing a conventional technology.
Figure 11:
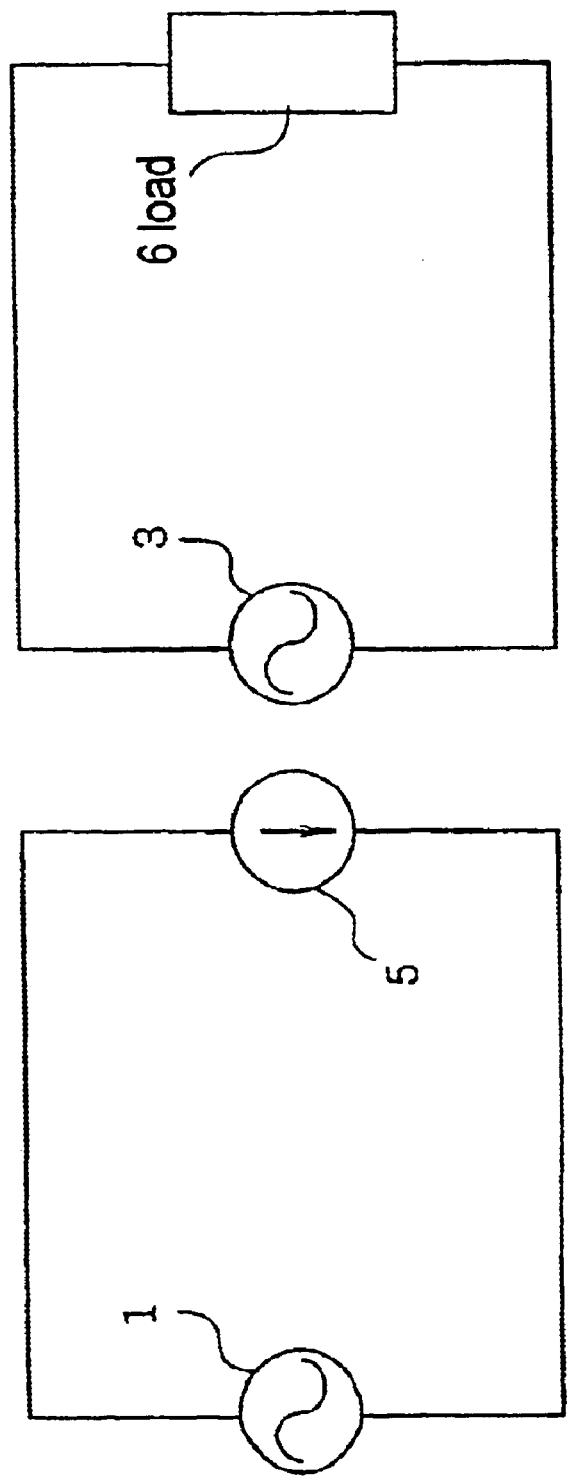
FIG. 11 is a diagram for explaining the principle of the conventional technology.

FIG. 9 is a block circuit diagram showing a seventh embodiment of the invention corresponding to a tenth aspect of the invention.

In a circuit configuration according to the seventh embodiment, the connection point of the fourth capacitor 33 shown in FIG. 1 is changed. The fourth capacitor 33 is connected between the connection point of the load 6 and the second reactor 41 and the series connection point of the first and second capacitors 30 and 31.

The other configurations are the same as those in FIG. 1, thereby omitting the descriptions.

In the circuit configuration described above, similar to FIG. 1, the capacitors 30 and 31, the switching devices 12 and 13, and the diodes 16 and 17 constitute the series converter connected between the AC power supply 1 and the load 6 in series. The capacitors 30 and 31, the switching devices 10 and 11, and the diodes 14 and 15 constitute the parallel converter connected to the AC power supply 1 in parallel.

Further, the first reactor 40 and the third capacitor 32 constitute an AC filter for suppressing a switching ripple of the parallel converter, and the second reactor 41 and the fourth capacitor 33 constitute an AC filter for suppressing a switching ripple of the series converter.

An operation of the embodiment has the principle same as that of the embodiment shown in FIG. 1. The series compensation voltage source 2 (series converter) shown in FIG. 2 generates an arbitrary voltage, so that the voltages from the two power supplies, i.e. the AC power supply 1 (AC voltage source) and the series compensation voltage source 2, are added and applied to the load 6. As a result, even if the voltage of the AC power supply 1 drops, it is possible to compensate the voltage drop by adding the variable voltage from the series compensation voltage source 2, so that a constant voltage can be supplied to the load 6.

The series compensation voltage source 2 can add or subtract the voltage to or from the AC power supply 1 through the PWM control of the series converter having the capacitors 30 and 31 as the power supply. When the voltage is added or subtracted, the energy changed due to the charging and discharging of the capacitors 30 and 31 can be compensated through charging and discharging the capacitors 30 and 31 by the PWM control of the parallel compensation current source 4 (parallel converter), so that the energy is balanced as a whole.

As this time, the switching ripple (high-frequency ripple) caused by the PMW operations of the parallel converter and the series converter is removed through the AC filter consisting of the reactor 41 and the capacitor 33 or by the AC filter consisting of the reactor 40 and the capacitor 32, thereby preventing leak to the sides of the power supply 1 and the load 6.

Accordingly, in the embodiment, the energy supplied to the load 6 flows only through the series converter in the electric power converter, and the energy used only for the voltage compensation by the series converter flows through the parallel converter. Therefore, as compared with the conventional double converter, it is possible to reduce the loss of the parallel converter and improve the conversion efficiency.

Incidentally, in the configuration shown in FIG. 9, the voltage detecting means 70, the current detecting means 71, and the voltage and reactor current control means 72 shown in FIG. 4 may be added. The resulting circuit configuration corresponds to an eleventh aspect of the invention.

Similarly, in the configuration shown in FIG. 9, the charging and discharging means 61 and the energy storage element 60 shown in FIG. 6, or the discharging means 63 and the energy storage element 60 shown in FIG. 7 may be added. The resulting circuit configurations correspond to a twelfth aspect of the invention.

Further, in the configuration shown in FIG. 9, the tapped reactor 42 shown in FIG. 8 may be used instead of the reactor 41. At the same time, similar to FIG. 8, the both ends of the tapped reactor 42 may be connected to the series connection point of the capacitors 30 and 31 and the series connection point of the switching devices 12 and 13, respectively, and the tap terminal of the tapped reactor 42 may be connected to one end of the AC power supply 1. The resulting circuit configuration corresponds to a thirteenth aspect of the invention.

Figure 12:
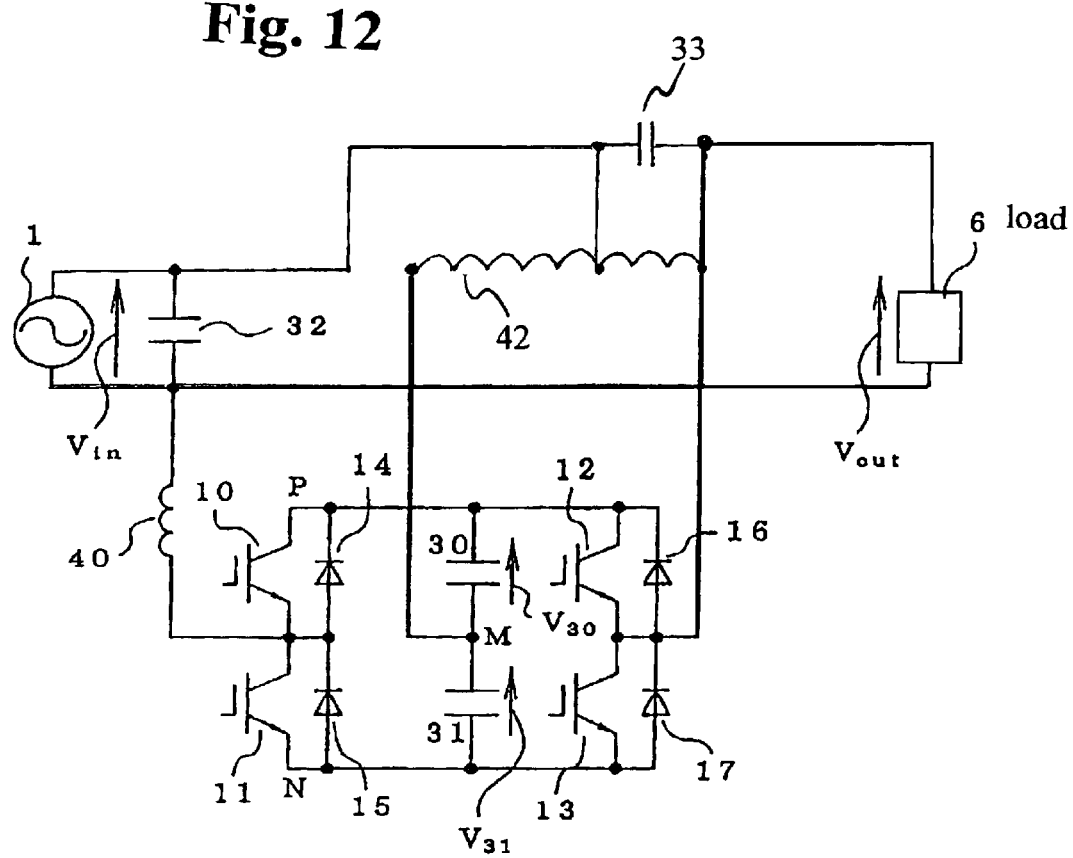
FIG. 12 is a block circuit diagram showing a further embodiment of the invention.

Further, as described above, the tapped reactor 42 shown in FIG. 8 may be used instead of the reactor 41 shown in FIG. 9, and, at the same time, the charging and discharging means 61 and the energy storage element 60 shown in FIG. 6, or the charging means 62, the discharging means 63 and the energy storage element 60 shown in FIG. 7 may be added (FIG. 12). The resulting circuit configurations correspond to a fourteenth aspect of the invention.

As described above, the present invention is applicable to the electric power converter of the double converter type in which the arbitrary AC electric power can be supplied to the load from the AC power supply in the form of the current output through the operations of the series converter and the parallel converter. At this time, the other electric power converter suppresses the generated loss, thereby improving the conversion efficiency and reducing the running cost. Further, a part with a limited life such as an electrolytic capacitor is not necessary, thereby improving the life of the device and improving the reliability.

What is claimed is:

1. An electric power converter comprising:
    a series converter connected in series between an AC power supply and a load, the series converter having a capacitor as a converter power supply thereof; and
    a parallel converter connected parallel to the AC power supply;
    wherein the series converter compensates a change caused in a voltage of the AC power supply to keep the voltage fed to the load at a certain value; and
    the parallel converter conducts charging and discharging operations between the AC power supply and the capacitor to compensate the voltage changes of the capacitor caused by the compensating operation of the series converter.

2. The electric power converter according to claim 1, wherein said series converter and said parallel converter comprise:
    a first series switch circuit including a first semiconductor switching device, a second semiconductor switching device, a first diode connected in opposite parallel to the first semiconductor switching device, and a second diode connected in opposite parallel to the second semiconductor switching device, the first and second semiconductor switching devices being connected in series to each other;
    a second series switch circuit including a third semiconductor switching device, a fourth semiconductor switching device, a third diode connected in opposite parallel to the third semiconductor switching device, and a fourth diode connected in opposite parallel to the fourth semiconductor switching device, the third and fourth semiconductor switching devices being connected in series to each other; and
    a series capacitor circuit including a first capacitor and a second capacitor connected in series to each other,
    wherein the series capacitor circuit and the second series switch circuit constitute the series converter, and the series capacitor circuit and the first series switch circuit constitute the parallel converter,
    said electric power converter further comprising:
    a third capacitor connected in parallel to the AC power supply;
    a fourth capacitor connected in parallel to the load;
    a first reactor connected between a first end of the AC power supply and a series connection point in the first series switch circuit, the first end of the AC power supply being connected to a first end of the load; and
    a second reactor connected between a second and of the load and a series connection point in the second series switch circuit;
    wherein the first series switch circuit, the second series switch circuit, and the series capacitor circuit are connected in parallel to each other to thereby constitute a first parallel connection circuit; and
    the second end of the AC power supply is connected to the series connection point in the series capacitor circuit.

3. The electric power converter according to claim 2, further comprising:
    voltage detecting means for detecting an input voltage of the electric power converter, an output voltage of the electric power converter, and a voltage in the first parallel connection circuit:
    current detecting means for detecting a current flowing through the first reactor; and
    controlling means for controlling the output voltage of the electric power converter and current flowing through the first reactor by using values detected by the voltage detecting means and the current detecting means.

4. The electric power converter according to claim 2, further comprising:
    a changeover switch including a first changeover contact, a second changeover contact, and a common terminal so that a connection between the second end of the load and a first end of the second reactor can be disconnected,
    wherein the first changeover contact is connected to a series connection point in the series capacitor circuit; the second end of the load is connected to the first end of the second reactor via the common terminal and the second changeover contact while the electric power converter is working normally; and the common terminal is connected to the first changeover contact when an anomaly is caused in the electric power converter, to thereby feed a voltage from the AC power supply to the load.

5. The electric power converter according to claim 4, further comprising:
    an energy storage element; and
    charging and discharging means connected to the energy storage element, to thereby feed a voltage to the load using the energy stored in the energy storage element when the power supply voltage is anomalous.

6. The electric power converter according to claim 2, further comprising:
    an energy storage element; and
    charging and discharging means connected to the energy storage element, to thereby feed a voltage to the load using the energy stored in the energy storage element when the power supply voltage is anomalous.

7. An electric power converter according to claim 1, wherein energy supplied to the load only passes through the series converter, and energy used only for voltage compensation by the series converter flows through the parallel converter.

8. The electric power converter according to claim 1, wherein said series converter and said parallel converter comprise:
    a first series switch circuit including a first semiconductor switching device, a second semiconductor switching device, a first diode connected in opposite parallel to the first semiconductor switching device, and a second diode connected in opposite parallel to the second semiconductor switching device, the first and second semiconductor switching devices being connected in series to each other;
    a second series switch circuit including a third semiconductor switching device, a fourth semiconductor switching device, a third diode connected in opposite parallel to the third semiconductor switching device, and a fourth diode connected in opposite parallel to the fourth semiconductor switching device, the third and fourth semiconductor switching devices being connected in series to each other; and
    a series capacitor circuit including a first capacitor and a second capacitor connected in series to each other,
    wherein the series capacitor circuit and the second series switch circuit constitute the series converter, and the series capacitor circuit and the first series switch circuit constitute the parallel converter, said electric power converter further comprising:

a third capacitor connected in parallel to the AC power supply;

a first reactor connected between a first end of the AC power supply and a series connection point in the first series switch circuit, the first end of the AC power supply being connected to a first end of the load;

a second reactor having a tap terminal and connected between a second end of the load and a series connection point in the series capacitor circuit; and a fourth capacitor connected between the second end of the load and a second end of the AC power supply;

wherein a series connection point in the second series switch circuit is connected to the second end of the load via a second end of the second reactor;

the first series switch circuit, the second series switch circuit, and the series capacitor circuit are connected in parallel to each other to thereby constitute a first parallel connection circuit; and the second end of the AC power supply is connected to the tap terminal of the second reactor.

9. The electric power converter according to claim 1, wherein said series converter and said parallel converter comprise:

a first series switch circuit including a first semiconductor switching device, a second semiconductor switching device, a first diode connected in opposite parallel to the first semiconductor switching device, and a second diode connected in opposite parallel to the second semiconductor switching device, the first and second semiconductor switching devices being connected in series to each other;

a second series switch circuit including a third semiconductor switching device, a fourth semiconductor switching device, a third diode connected in opposite parallel to the third semiconductor switching device, and a fourth diode connected in opposite parallel to the fourth semiconductor switching device, the third and fourth semiconductor switching devices being connected in series to each other; and a series capacitor circuit including a first capacitor and a second capacitor connected in series to each other, wherein the series capacitor circuit and the second series switch circuit constitute the series converter, and the series capacitor circuit and the first series switch circuit constitute the parallel converter, said electric power converter further comprising a third capacitor connected in parallel to the AC power supply;

a fourth capacitor connected in parallel to the load;

a first reactor connected between a first end of the AC power supply and a series connection point in the first series switch circuit, the first end of the AC power supply being connected to a first end of the load; and a second reactor having a tap terminal and connected between a second end of the load and a series connection point in the series capacitor circuit;

wherein a series connection point in the second series switch circuit is connected to the second end of the load via a second end of the second reactor;

the first series switch circuit, the second series switch circuit, and the series capacitor circuit are connected in parallel to each other to thereby constitute a first parallel connection circuit; and the second end of the AC power supply is connected to the tap terminal of the second reactor.

10. The electric power converter according to claim 1, wherein said series converter and said parallel converter comprise:

a first series switch circuit including a first semiconductor switching device, a second semiconductor switching device, a first diode connected in opposite parallel to the first semiconductor switching device, and a second diode connected in opposite parallel to the second semiconductor switching device, the first and second semiconductor switching devices being connected in series to each other;

a second series switch circuit including a third semiconductor switching device, a fourth semiconductor switching device, a third diode connected in opposite parallel to the third semiconductor switching device, and a fourth diode connected in opposite parallel to the fourth semiconductor switching device, the third and fourth semiconductor switching devices being connected in series to each other; and a series capacitor circuit including a first capacitor and a second capacitor connected in series to each other, wherein the series capacitor circuit and the second series switch circuit constitute the series converter, and the series capacitor circuit and the first series switch circuit constitute the parallel converter, said electric power converter further comprising:

a third capacitor connected in parallel to the AC power supply;

a first reactor connected between a first end of the AC power supply and a series connection point in the first series switch circuit, the first end of the AC power supply being connected to a first end of the load;

a second reactor connected between a second end of the load and a series connection point in the second series switch circuit; and a fourth capacitor connected between the second end of the load and a second end of the AC power supply;

wherein the first series switch circuit, the second series switch circuit, and the series capacitor circuit are connected in parallel to each other, to thereby constitute a first parallel connection circuit; and the second end of the AC power supply is connected to a series connection point of the series capacitor circuit.

11. The electric power converter according to claim 10, further comprising:

voltage detecting means for detecting an input voltage of the electric power converter, an output voltage of the electric power converter, and a voltage of the first parallel connection circuit:

current detecting means for detecting a current flowing through the first reactor; and controlling means for controlling an output voltage of the electric power converter and a current flowing through the first reactor by using a voltage value detected by the voltage detecting means and a current value detected by the current detecting means.

12. The electric power converter according to claim 10, further comprising:

an energy storage element; and charging and discharging means connected to the energy storage element, to thereby feed a voltage to the load using an energy stored in the energy storage element when the power supply voltage is anomalous.

* * * * *

UNITED STATES PATENT AND TRADEMARK OFFICE
CERTIFICATE OF CORRECTION

PATENT NO. : 6,940,734 B2
DATED : September 6, 2005
INVENTOR(S) : Okuma

It is certified that error appears in the above-identified patent and that said Letters Patent is hereby corrected as shown below:

Columne 11,
Line 57, please change "and" to -- end --,

Column 13,
Line 13, please change "a fourth capacitor connected between the second end of the load and a second end of the AC power supply;" to -- a fourth capacitor connected in parallel to the load; --, and
Line 52, please change "a fourth capacitor connected in parallel to the load;" to -- a fourth capacitor connected between the second end of the load and second end of the AC power supply; --.

Signed and Sealed this

First Day of November, 2005

JON W. DUDAS
*Director of the United States Patent and Trademark Office*